United States Patent
Padros et al.

(10) Patent No.: US 10,291,031 B2
(45) Date of Patent: May 14, 2019

(54) METHOD FOR CONTROLLING POWER FLUCTUATION RAMPS HAVING ENERGY STORAGE SYSTEMS IN PLANTS FOR INTERMITTENT ENERGY GENERATION

(71) Applicant: Acciona Energia, S.A., Sarriguren (Navarra) (ES)

(72) Inventors: Maria Asuncion Padros, Sarriguren (ES); Daniel Rabal, Sarriguren (ES); Inigo Berazaluce, Sarriguren (ES); David Cuesta, Sarriguren (ES); Luis Marroyo, Pamplona (ES); Javier Marcos, Pamplona (ES)

(73) Assignee: ACCIONA ENERGIA, S.A., Sarriguren (Navarra) (ES)

( * ) Notice: Subject to any disclaimer, the term of this patent is extended or adjusted under 35 U.S.C. 154(b) by 238 days.

(21) Appl. No.: 15/025,925

(22) PCT Filed: Sep. 30, 2013

(86) PCT No.: PCT/ES2013/070675
§ 371 (c)(1),
(2) Date: Mar. 30, 2016

(87) PCT Pub. No.: WO2015/044466
PCT Pub. Date: Apr. 2, 2015

(65) Prior Publication Data
US 2016/0241041 A1    Aug. 18, 2016

(51) Int. Cl.
*H02J 7/00* (2006.01)
*H02J 3/38* (2006.01)
*H02J 3/32* (2006.01)

(52) U.S. Cl.
CPC .............. *H02J 3/383* (2013.01); *H02J 3/32* (2013.01); *H02J 3/386* (2013.01); *H02J 7/0068* (2013.01);
(Continued)

(58) Field of Classification Search
USPC .......................................... 320/132, 134, 136
See application file for complete search history.

(56) References Cited

U.S. PATENT DOCUMENTS

2010/0057267 A1* 3/2010 Liu ........................... H02J 3/18
700/297
2012/0235484 A1   9/2012 Yamada et al.
(Continued)

FOREIGN PATENT DOCUMENTS

JP   2001327080 A   11/2001
JP   2008259357 A   10/2008
WO  2013122079 A1   8/2013

*Primary Examiner* — Brian Ngo
(74) *Attorney, Agent, or Firm* — Hayes Soloway PC

(57) ABSTRACT

The invention falls within the technical field associated with methods for controlling power fluctuation ramps using energy storage systems in plants for intermittent energy generation, wherein said method reduces the size of the energy storage system necessary to fulfill the requirement of a maximum power fluctuation ramp, by means of a step of imposing a maximum power variation ramp by imposing the dynamic component of the ramp, defined as the gradient according to which the power of the plant is varied in each control cycle in accordance with the state of charge of the energy storage system (SOC).

19 Claims, 13 Drawing Sheets

(52) U.S. Cl.
CPC .......... *Y02E 10/563* (2013.01); *Y02E 10/566* (2013.01); *Y02E 10/763* (2013.01); *Y02E 70/30* (2013.01)

(56) References Cited

U.S. PATENT DOCUMENTS

| | | | |
|---|---|---|---|
| 2013/0257057 A1* | 10/2013 | Legacy | F03B 13/08 |
| | | | 290/52 |
| 2014/0103726 A1* | 4/2014 | Martin | H02M 7/493 |
| | | | 307/65 |
| 2014/0149038 A1* | 5/2014 | Cronin | G01W 1/10 |
| | | | 702/3 |
| 2015/0019034 A1* | 1/2015 | Gonatas | H01L 31/02021 |
| | | | 700/291 |
| 2015/0021998 A1* | 1/2015 | Trescases | H02J 5/00 |
| | | | 307/46 |

* cited by examiner

METHOD FOR CONTROLLING POWER FLUCTUATION RAMPS HAVING ENERGY STORAGE SYSTEMS IN PLANTS FOR INTERMITTENT ENERGY GENERATION

OBJECT OF THE INVENTION

The present invention may be included in the technical field of methods for the control of power fluctuation ramps with energy storage systems in intermittent power generation plants.

The object of the present invention is a method for the control of power fluctuation ramps with energy storage systems in intermittent renewable power generation plants, such as for example a photovoltaic solar plant, which reduces the size of storage systems necessary to meet the requirement of a maximum power fluctuation ramp, reducing thus investment costs in the plant and/or carrying out a rationalized use of the energy storage system, in such a way that in order to achieve the same maximum fluctuation ramp, a minor use is done of the energy storage system, extending its working life and therefore reducing the plant operational costs.

BACKGROUND OF THE INVENTION

Photovoltaic solar energy production depends on the global radiation available, which depends, for a determined location, on the day of the year and the time of the day, but also on meteorological effects such as clouds or aerosols in the particular location of the photovoltaic panels.

Therefore, along any given day, the photovoltaic solar power will vary importantly. On a sunny day, for example, it will show a predictable variation because of the different levels of radiation along the day, and because of the different angles the sun will form during the day with the photovoltaic solar panels as a function of the type of tracking capacity they have.

On a cloudy day, the production will show additional variations that can be much faster depending on the photovoltaic plant size and the speed to which the clouds move over it, wherein the power curves will be completely different for a clear day, a partly cloudy day and a completely cloudy day.

Cloudiness is difficult to forecast and fast with respect to its effects, so it can cause fluctuations in the photovoltaic plants production which cause problems in the electrical system stability. The electrical grid operators have carried out several researches about the fluctuations effects since, as they cannot be foreseen, the grid has to be provided with enough control capacity to absorb them. The maximum power variations in photovoltaic plants may even reach 90% in very short time intervals, of less than a minute.

In the case of a wind farm, the wind resource obtained is also variable depending on the meteorological conditions, so the effects are similar to those present in photovoltaic plants, although with different dynamics and time schedules.

One of the ways to solve power fluctuations is to control the generation by limiting the power variation maximum speed, typically with the maximum ramp value which power variation may have in each control cycle. That requires predicting fluctuations and acting in advance limiting the production of the plant. In order to predict fluctuations, it would be required to accurately assess the modifications of the meteorological parameters causing them. Poor forecast of the meteorological variables and the effects thereof on the plant production may cause great losses in this process and may justify the investment in energy storage systems.

The way the established regulations deal with this problem is by setting power variation maximum ramps to the power being fed into the grid by the intermittent generation plants. In this way, it can be ensured that the power variation of a plant, or a group of plants, does not exceed the dynamics with which other plants in the system may increase or reduce power, so that the production and consumption balance is not altered at each moment.

In order to set these values, possible power variation speed for thermal power plants, between 2.5%-4% of its nominal power per minute, being part of the manageable generation, is usually taken as a reference. Thereby, it is ensured that the rest of the system, if it is provided with enough control capacity, may respond to quick power losses in the intermittent power generation plants. Another option is to consider that the aggregation of nearby plants will produce a variation in the power obtained as a sum of all of them, which is less than the power from each individual plant, so it is possible to set a maximum ramp for each plant higher than the ramp which can be managed with the available control capacity, for example 10% of the nominal power per minute.

The plants with energy storage may control variation speed of the output by means of power charging and discharging of the storage systems. For example, a 1.2 MWp plant can be added a 1 MW-560 kWh battery system with which output power variations from the plant can be controlled according to a maximum ramp determined by the control system.

There are different strategies known from the state of the art used in solar and wind generation plants and having several energy storage technologies, where the usual way to control the power fluctuations is by storing the excess in the storage or transferring the deficit from the storage, so that when power increments are produced, the battery is charged so that the production being fed to the grid do not have great oscillations, whereas when power drops occur, the battery provides the power to keep up with the production being fed to the grid without great oscillations, where this procedure can be carried put in different ways obtaining different results.

The immediate way of doing this, referred to as ramps, is with a control algorithm which, in the time cycle being defined, sets a charging or discharging value for the battery, so that in the next cycle there is no value with a deviation higher than the one allowed by the power fluctuation maximum ramp. This can be seen in FIG. 4.

Another way of control known from the state of the art is the so called delay control, which defines a time window and proceeds with delivery according to the initial conditions in the plant at the beginning of said time window.

Different strategies use the battery in different ways, so that when the battery is less deeply cycled, it results in a longer working life of the battery and the other way round.

A delay strategy enables dimensioning the battery smaller, but it will be used in a greater extent, resulting in a shorter working life and greater power loss because of the input and output of power through the battery, which always involves a lower efficiency of the unit. Therefore, the economic calculation requires both considerations.

DESCRIPTION OF THE INVENTION

The present invention solves the technical problem stated, by means of a method for the control of power fluctuation ramps with energy storage systems in intermittent generation plants, which reduces the energy storage system size necessary to meet the requirements of a power fluctuation maximum ramp, which reduces the size of storage systems necessary to meet the requirement of a maximum power fluctuation ramp, reducing thus investment costs in the plant and/or carrying out a rationalized use of the energy storage system, in such a way that in order to achieve the same maximum fluctuation ramp, a minor use is done of the energy storage system, extending its working life and therefore reducing the plant operational costs.

In any of the strategies mentioned in the background of the invention section, as the control of the plant power output is carried out by charging or discharging a finite capacity storage system, it is necessary to bring the state of charge (SOC) to a defined value, that is, a target SOC. Thus, the storage system will not reach its maximum and minimum technical values allowed, and it will ensure the storage system has enough stored power and power charging capacity enough to achieve its functionality. The strategy charging the storage system when the SOC lowers down from a determined value, and discharging the battery when the SOC goes up from determined value, will be referred to as algorithm for the state of charge; or as a charging and discharging component which depends on the spacing between SOC at each moment and the target SOC.

Therefore, the storage system design to be incorporated in an intermittent generation plant is realized determining in the first place the global operation strategy. Up to now, strategies for control tracking of fluctuation maximum ramps and ramp delay have been mentioned. From those fluctuations of the solar or wind resource foreseen and the strategy to be followed, the power charging and discharging capacity that the storage system associated to the generation plant will require, will be determined. Thus, the total power capacity of the energy storage system and a target SOC will be measured, so that the battery can provide the specified charging and discharging capacity. A strategy will be included in order that, during operation, the storage system SOC does not deviate too much from the target, so that achievement of the required functionality is ensured over time.

The method for the control of power fluctuation ramps with energy storage systems of the present invention, which can be applied to, for example, a photovoltaic solar plant, and where the energy storage system is for example a battery, comprises a stage of setting a power variation maximum ramp to the power being fed into the grid by the intermittent power generation plant.

The invention takes into account that both the conditions for the output power fluctuation control of the plant, and the conditions of the state of charge of the storage system may be dynamic in such a way that they vary according to other parameters. The variation records make sense knowing the application and how the renewable intermittent generation plants, object of the present invention, work.

The stage of setting a power variation maximum ramp to the power being fed into the grid by the intermittent power generation plant is carried out, in the method of the present invention, by means of:

a substage of setting the dynamic component of the ramp defined as the slope with which the power in the plant is to be varied in each control cycle, according to the state of charge of the energy storage system (SOC), and/or a substage of setting the target state of charge ($SOC_{tar}$) of the energy storage system dynamically, according to the instant power generated by the plant, and/or foreseeing thereof by means of weather forecasting.

In case the stage of setting the power variation maximum ramp to the power being fed into the grid by the intermittent power generation plant, is carried out by means of the substage of setting the dynamic component defined as the slope with which the output power in the plant is to be varied in each control cycle, according to the state of charge of the energy storage system (SOC), it is ensured that the power variation of a plant, or a group of plants, does not exceed the maximum dynamics allowed; fixed accordingly in order that other plants in the system may increase or reduce power, so that the production and consumption balance of the whole system is not altered at each moment.

Thus, if the state of charge is below a reference value, the slopes are modified so as to help the storage system to be charged. If the state of charge of the storage system is higher than the reference value, the slopes are modified so as to help discharging the storage system, always achieving the maximum slopes allowed.

Thus, the use of the energy storage system is reduced (number of charging/discharging cycles in case of a battery), since by means of using dynamic limiting maximum ramps for power variation, according to the state of charge of the energy storage system, the battery deviates the least possible from the state of charge set as a target.

In case the stage of setting the power variation maximum ramp to the power being fed into the grid by the intermittent power generation plant, is carried out by means of the substage of setting the target state of charge ($SOC_{tar}$) of the energy storage system dynamically, according to the instant power generated by the plant, and/or foreseeing thereof by means of weather forecasting, it is ensured that if the plant is generating a power close to the nominal power the target SOC will be increased, since the fluctuation that can occur will produce discharging of the energy storage system, whereas if the power being generated is a reduced power, the target SOC will be reduced as well.

Thus, the energy storage system is dimensioned in a more optimal way, reducing the use thereof and extending its working life. Setting the target state of charge ($SOC_{tar}$) of the energy storage system dynamically will enable, essentially, to reduce the energy storage system size required to achieve a maximum ramp.

The combination of both setting substages reaches an optimum depending on its application.

Optionally, the substage of setting the ramp dynamic component defined as the slope with which the power in the plant is to be varied in each control cycle, according to the state of charge of the energy storage system (SOC), comprises a stage of filtering the dynamic ramps for them not to operate if the plant power is too low or if it is too close to the nominal power.

This happens because, under the aforementioned conditions of power generated by the plant, great fluctuations can occur in the plant output which can reach a 90%. This condition will never, logically, take place if the plant generates 40 or 60% of its nominal power. This filtering will make the dynamic ramps to be only applicable within a generated power range per plant (preferably between 30 and 70% of the nominal power), and out of that range maximum ramp limitations are applied.

As well as the two substages described above which enables to carry out with the stage of setting a power variation maximum ramp to the power being fed into the grid by the intermittent generation plant, the method of the present invention may comprise a substage of setting a control algorithm of the state of charge for the energy storage system, which adds to the calculation a charging or discharging component so that in the next cycle there is no deviation from the target SOC, and always achieving the maximum limiting ramp allowed.

Therefore, this algorithm adds a charging component from the energy storage system if the state of charge of the energy storage system is below the target SOC, and a discharging component if the state of charge of the energy storage system is above the target SOC, being possible to use a dead band or hysteresis to limit the activation conditions of this algorithm to deviations from the target SOC which are great enough.

When the method uses the substage of setting an algorithm for the control of state of charge (SOC) of the energy storage system, if the plant generates more than for example a 70% of its nominal power, the target SOC increases from 50% to a value between 70 and 100%, whereas if the plant produces less than 30% of its nominal power, the target SOC is reduced from the 50% to a value between 0 and 30%.

In the next table, different parameters are shown between the present invention and the ramp and delay methods of the state of the art, showing the improvement in the different parameters due to said method for the case in which the energy storage system is a battery.

| Method | Dynamic ramp | Ramp | Delay |
|---|---|---|---|
| Maximum fluctuation (%/600 s) | 25 | 25 | 25 |
| Annual mean battery (kWh) | 120 | 240 | 312 |
| Annual maximum battery (kWh) | 500 | 540 | 368 |
| Battery use hours (% production hours) | 12 | 11 | 44 |

As it is shown in the table, by using dynamic ramps the energy storage system use is especially improved, system which in this case is a battery (reflected in the parameter "annual mean battery"), and thereby the cycles being carried out by the battery are reduced and its working life is extended, being this a critical point since the photovoltaic plants are designed to operate for at least 25 years. As it can be observed in the previous table, the annual maximum battery reflects the size of the battery to be installed in a plant per installed photovoltaic MW. The higher the number, the bigger the investment is in order to meet the requirements.

Furthermore, in case of combining the dynamic ramp with the dynamic SOC strategy, a reduction of the annual maximum battery required, increasing again the battery use, whereby an optimum use of both strategies could be found according to the specific project. The use of weather forecast to detect the conditions under which great power fluctuations will take place, it will be useful in order to apply the strategy of the dynamic SOC, only under these conditions, and join the size reduction of the battery, resulting in the least number of cycles of the battery in use and in the longer working life it implies.

Both strategies, as it has been commented, may be applied separately if the desired effect is that one of the two results predominates over the other.

In certain cases, the requirement of achieving the maximum ramp may be transformed in achieving power steps. If verification of power fluctuations is carried out with measuring equipment in the plant, which measures the production for example every 15 minutes, the accomplishment of a power fluctuation requirement will be only applied to intervals of 15 minutes. The ramp at that moment is turned into power steps every 15 minutes and the strategy of achievement can be adapted to the requirement, in such a way the use thereof is reduced.

The strategy referred to as step, known in the state of the art, ensures the fluctuation is measured in two time points spaced a certain value, for example, the above 15 minutes, but in shorter times.

The present invention uses energy storage systems, among which there may be the above mentioned battery, supercapacitors or even flywheels, in which the stored power is not electrical power, not being, however, limited to the previous ones.

The power intermittent generation plants to which the method of the present invention may be applied, are photovoltaic solar plants, wind farms or tidal power plants.

DESCRIPTION OF THE DRAWINGS

To implement the present description and in order to provide a better understanding of the characteristics of the invention, according to a preferred embodiment thereof, a set of drawings is attached as part of this description, with an illustrative but not limitative purpose, which represents the following.

PREFERRED EMBODIMENT OF THE INVENTION

A detailed description of a preferred embodiment of the present invention is now described, according to FIGS. 1 to 13 referred to above.

The method for the control of power fluctuation ramps with energy storage systems, which in this preferred embodiment example is a battery, and it can be applied to a solar photovoltaic plant, the method comprises a stage of setting a power variation maximum ramp to the power being fed into the grid by the photovoltaic solar plant by means of the combination of the following substages:

a substage of setting a dynamic component of a ramp defined as a slope with which the power in the plant is to be varied in each control cycle, according to a state of charge (SOC) of a energy storage system, a substage of setting a control algorithm of the state of charge of the energy storage system which adds to the calculation a component of charging or discharging the system, so that in the next cycle there is no deviation from a target SOC, and always achieving a limiting maximum ramp, and a substage of dynamically setting the target state of charge ($SOC_{tar}$) of the energy storage system, according to an instant power generated by the plant, and/or foreseeing thereof by means of weather forecasting.

Figure 1:
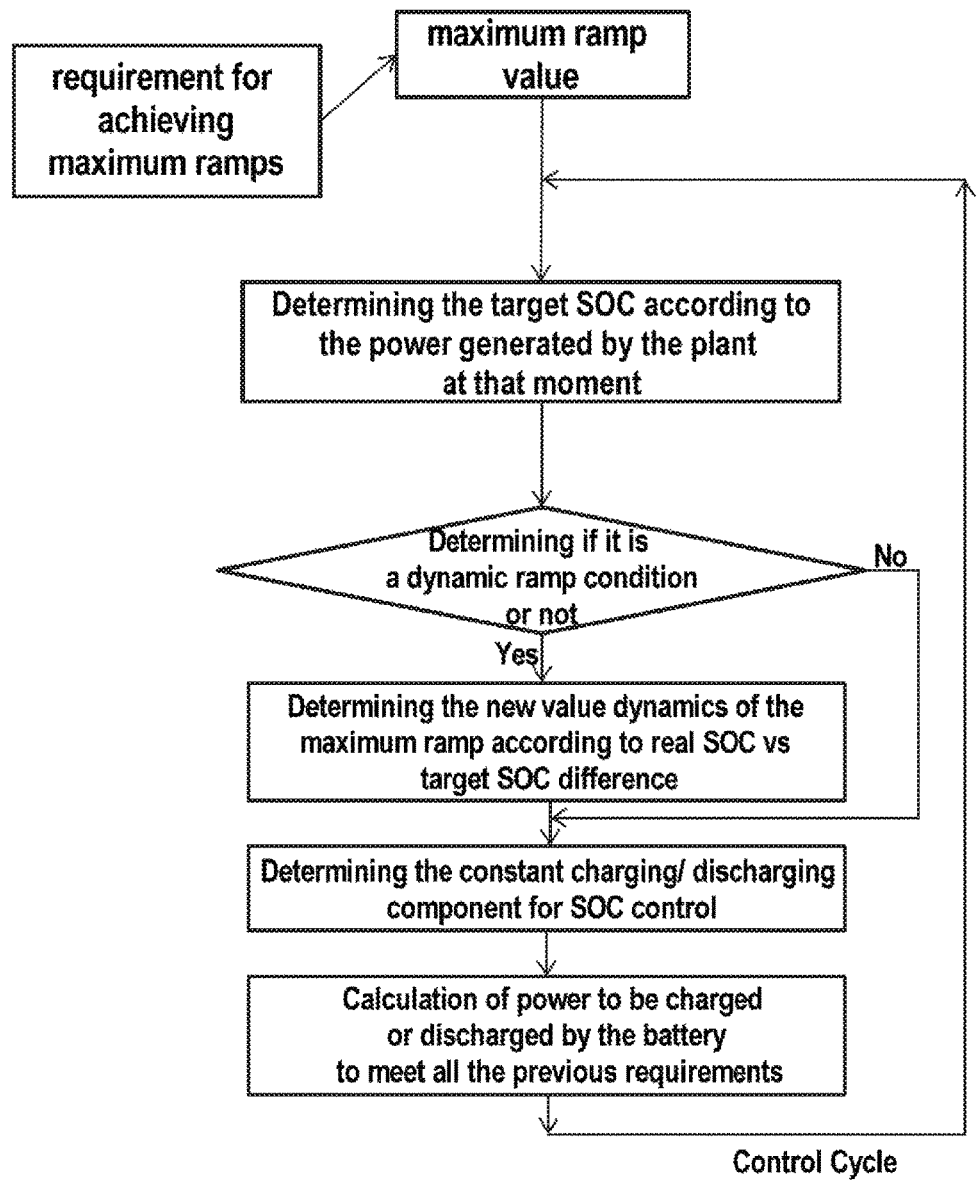
FIG. 1.—It shows a block diagram of the method of the invention according to a first preferred embodiment.

With this combination of substages the optimal method for the control of power fluctuations is accomplished, shown in the scheme of FIG. 1.

Figure 3:
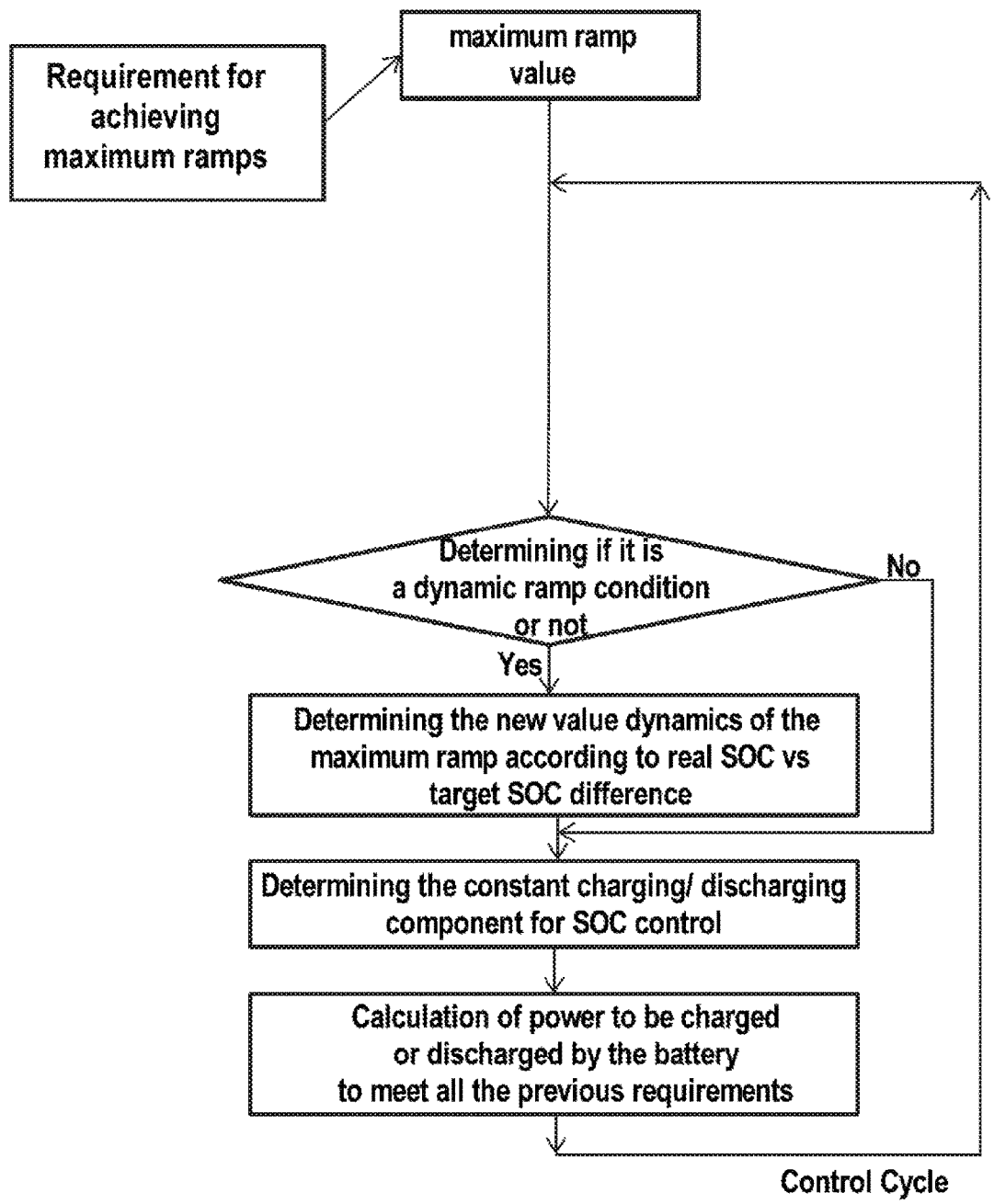
FIG. 3.—It shows a block diagram of the method of the invention according to a third preferred embodiment.
Figure 4:
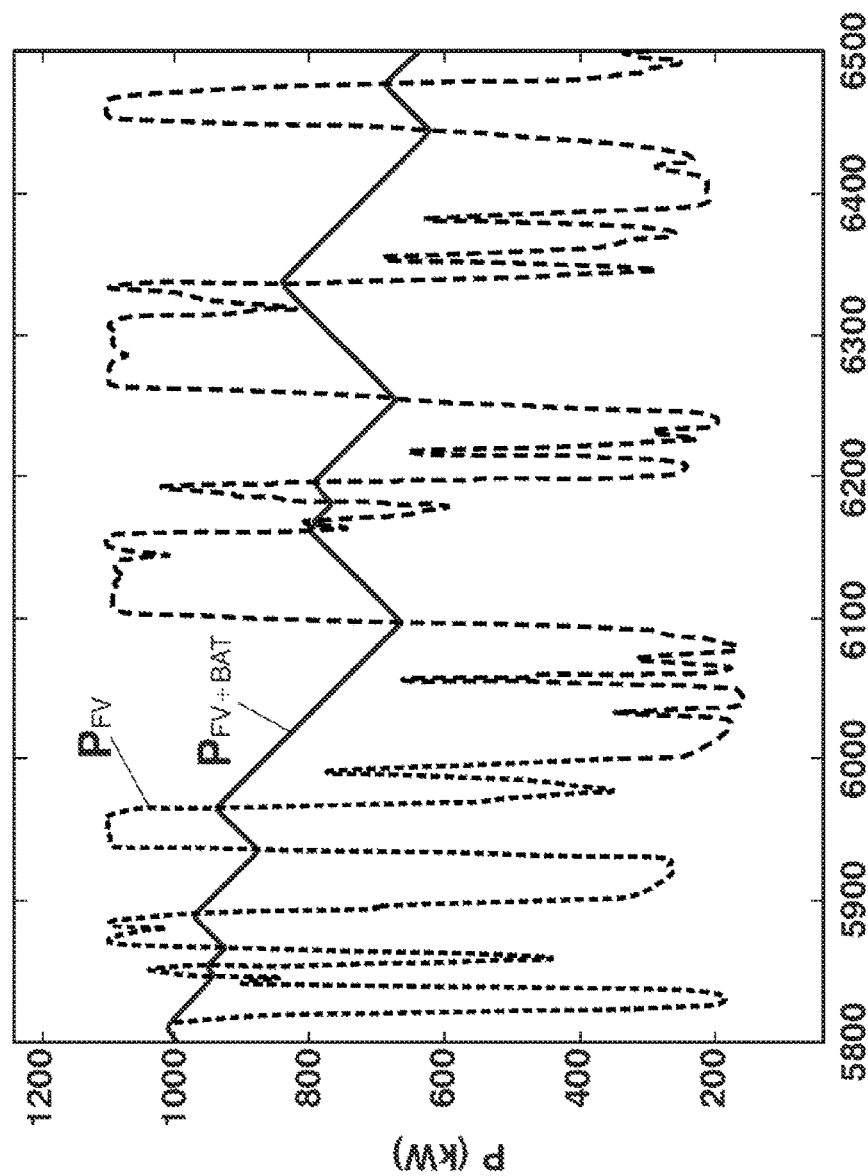
FIG. 4.—It shows a chart of the power evolution in a power intermittent generation plant, and the stage of setting a power variation maximum ramp to the power being fed into the grid by the intermittent generation plant, according to the state of the art.

Alternatively, as it is shown in the scheme of FIG. 3, a method is described for the control of power fluctuation ramps which only consists of:

a substage of setting the dynamic component of the ramp defined as the slope with which the power in the plant is to be varied in each control cycle, according to the state of charge (SOC) of the power storage system, and a substage of setting a control algorithm of the state of charge of the power storage system which adds to the calculation a component of charging or discharging the system, so that there is no deviation from the target SOC, and always achieving the limiting maximum ramp.

Figure 2:
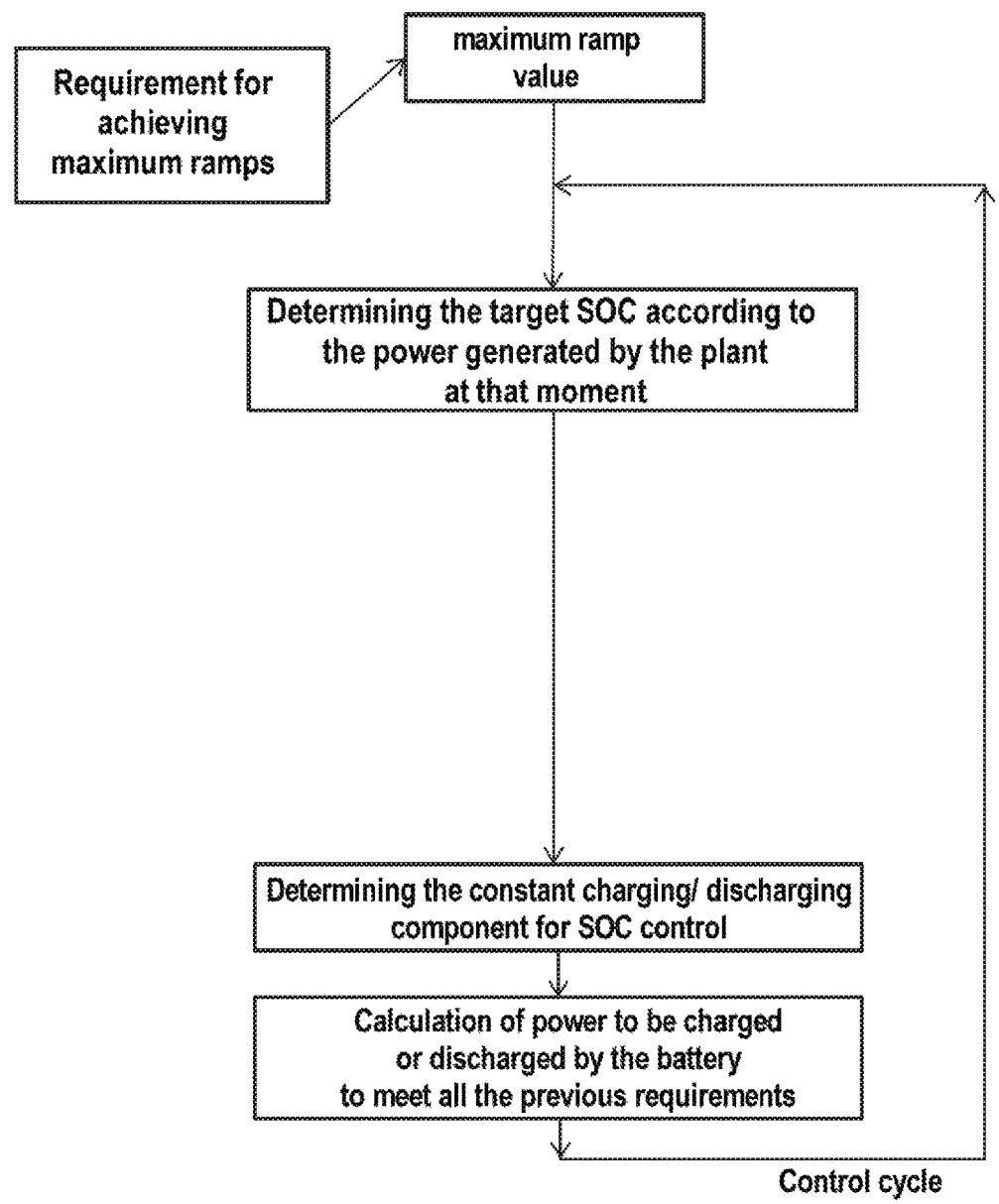
FIG. 2.—It shows a block diagram of the method of the invention according to a second preferred embodiment.

Also alternatively, and shown in the scheme of FIG. 2, a method is described for the control of power fluctuation ramps which only consists of:

a substage of setting a control algorithm of the state of charge of the power storage system which adds to the calculation a component of charging or discharging the system, so that there is no deviation from the target SOC, and always achieving the limiting maximum ramp, and a substage of setting the target state of charge ($SOC_{tar}$) of the power storage system dynamically, according to the instant power generated by the plant, and/or foreseeing thereof by means of weather forecasting.

The decision of choosing any of the alternatives described above can be carried out according to the weather forecast.

Figure 5:
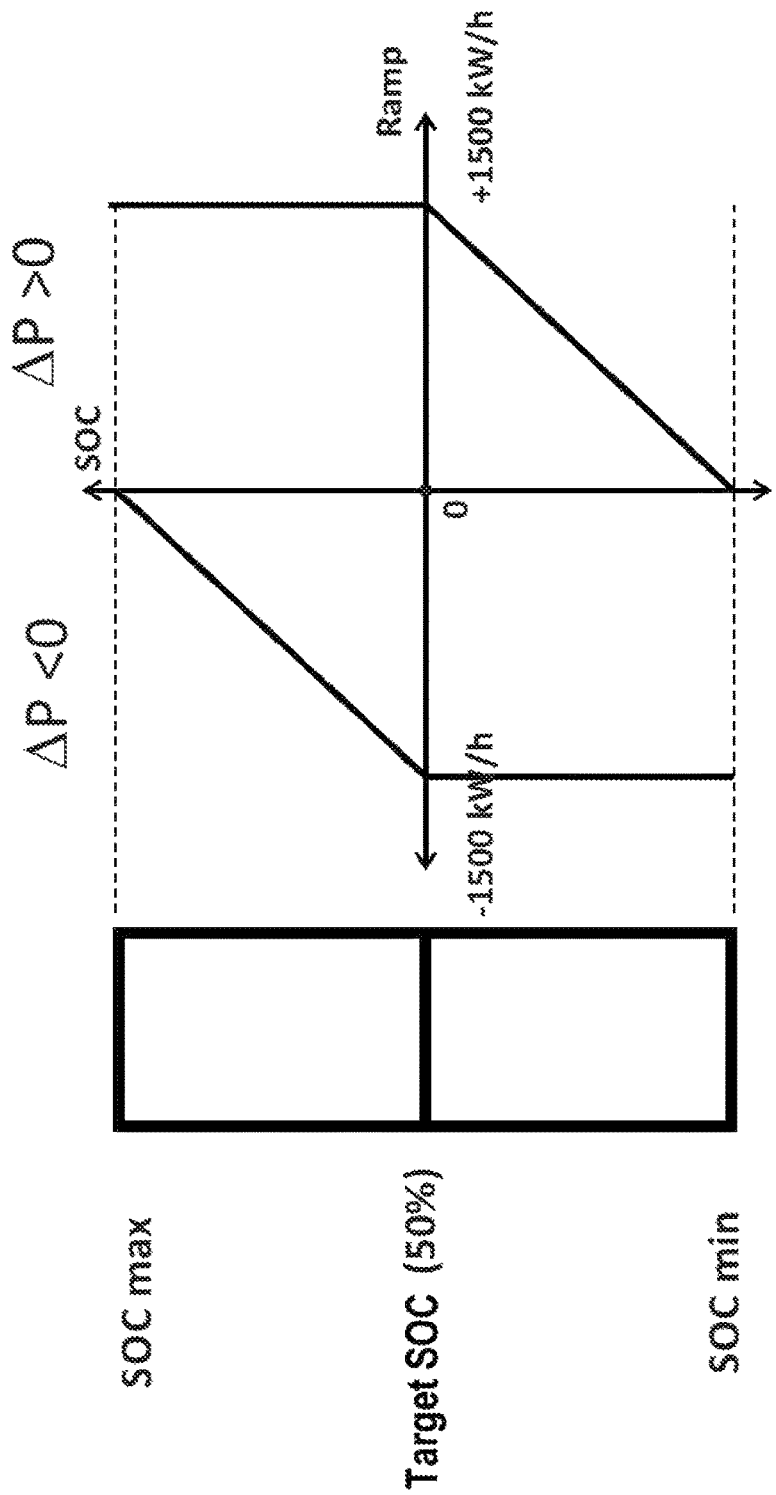
FIG. 5.—It shows a chart of the slope with which the power in the plant is to be varied in each control cycle, according to the state of charge of the energy storage system, particularly a battery, according to the method of the present invention. In said figure the SOC is 50%.
Figure 6:
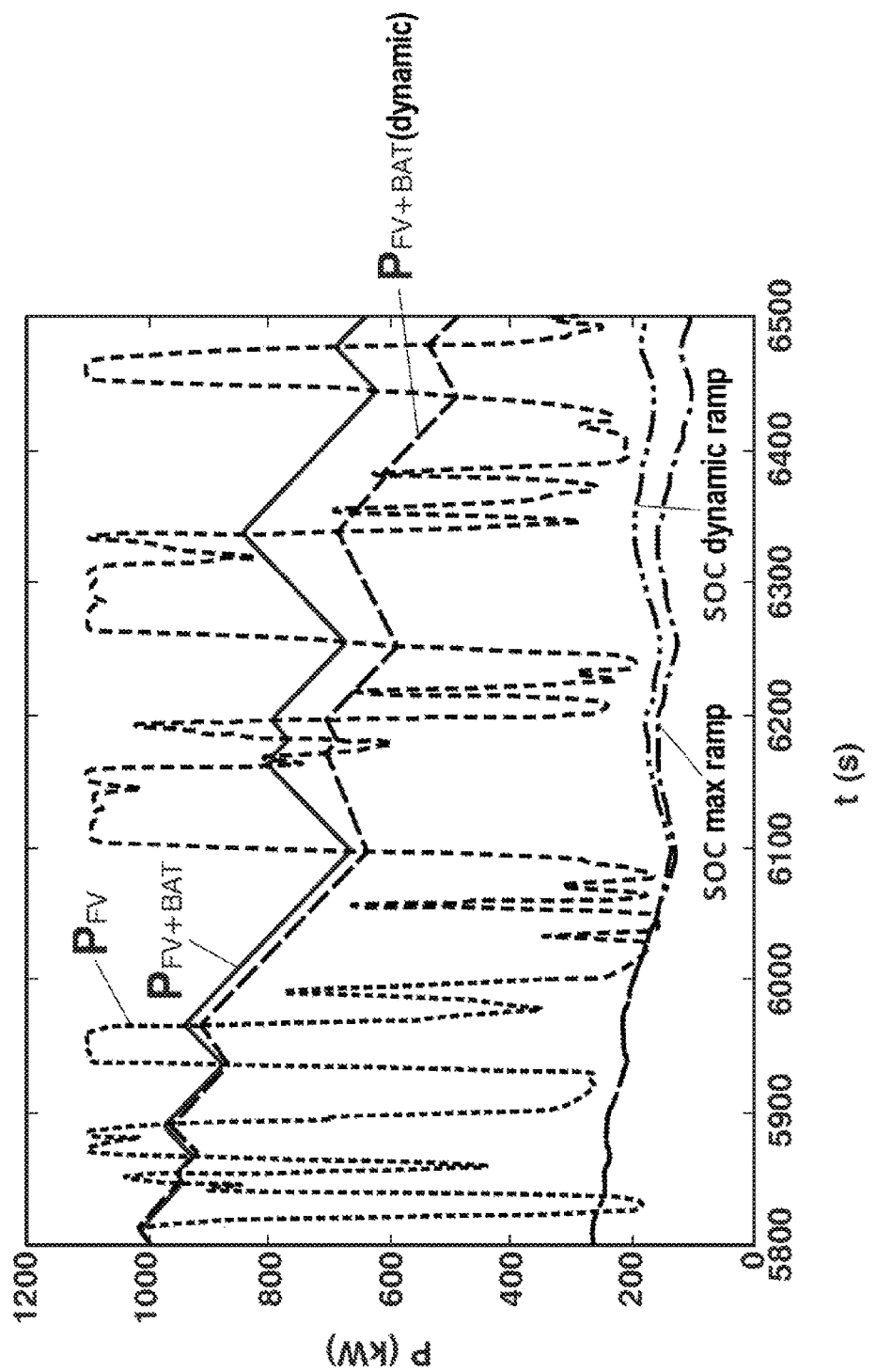
FIG. 6.—It shows a chart of the power evolution in a power intermittent generation plant and the substage of setting the dynamic component of the ramp defined as the slope with which the power in the plant is to be varied in each control cycle, according to the state of charge (SOC) of the energy storage system, according to the method of the present invention.

FIG. 5 shows a chart of the slope with which the power in the plant is to be varied in each control cycle, according to the state of charge of the energy storage system, particularly a battery, according to the substage of setting the dynamic component of the ramp defined as the slope with which the power in the plant is to be varied in each control cycle, according to the state of charge (SOC) of the energy storage system, FIG. 6 shows a chart of the power evolution in a intermittent power generation plant and the stage of setting the dynamic component of the ramp defined as the slope with which the power in the plant is to be varied in each control cycle, according to the state of charge (SOC) of the energy storage system.

Figure 7:
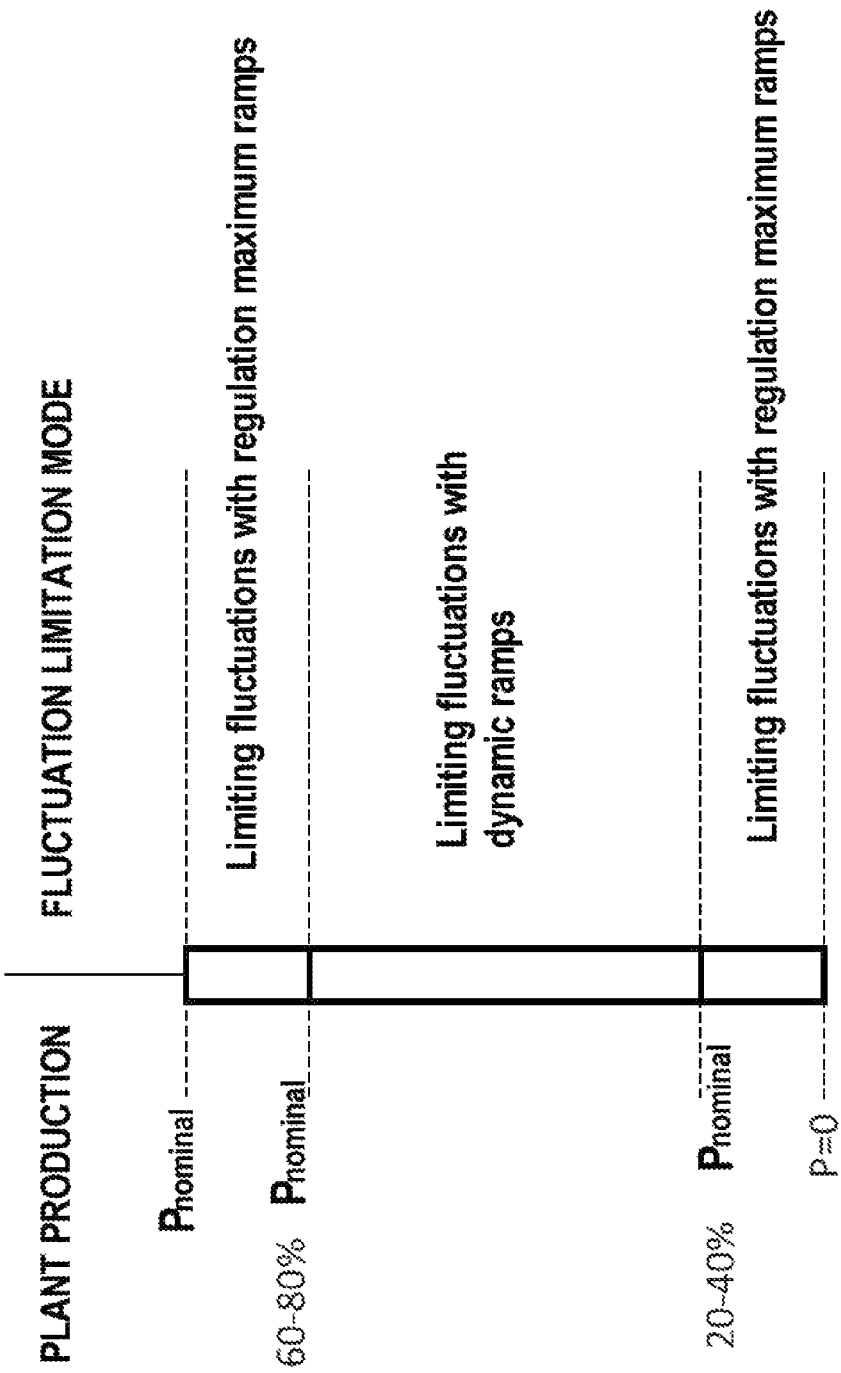
FIG. 7.—It shows a scheme of the use of dynamic ramps according to the power generated by the plant in a given moment, according to the present invention.

Optionally, the substage of setting the dynamic component of the ramp defined as the slope with which the power in the plant is to be varied in each control cycle, according to the state of charge (SOC) of the energy storage system, comprises a stage of filtering the dynamic ramps for them not to operate if the plant power is too low or if it is too close to nominal power, as it can be seen in FIG. 7. This filtering stage makes the substage of setting the dynamic component of the ramp defined as the slope with which the power in the plant is to be varied in each control cycle, according to the state of charge (SOC) of the energy storage system, to be only applicable within a power range generated by the plant (for example, taking as a lower range 20 and 40% of the nominal power, and as a higher range between 60 and 80% of the nominal power), applying out of that range the maximum ramp limitations.

Figure 8:
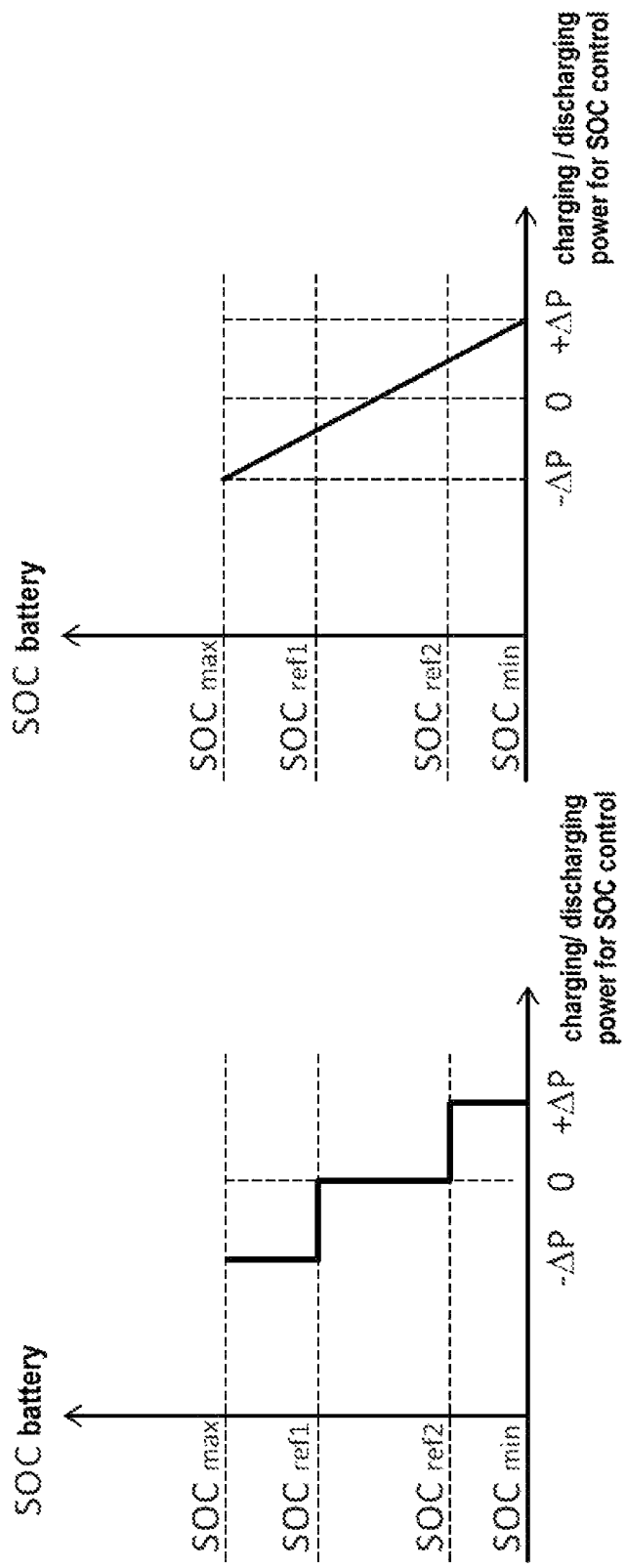
FIG. 8.—It shows two examples of the requirements for the application of the substage setting a control algorithm of the state of charge of the energy storage system.

FIG. 8 shows two examples of the requirements for the application of the substage of setting a control algorithm of the state of charge of the energy storage system. The algorithm applied by steps is shown to the left, and the algorithm applied in thousands of steps is shown to the right.

This substage of setting the algorithm adds a charging component from the battery if the state of charge of the energy storage system is below the target SOC, and a discharging component if the state of charge of the energy storage system is above the target SOC, being possible to use a dead band or hysteresis to limit the activation conditions of this algorithm to deviations from the target SOC which are great enough.

Figure 9:
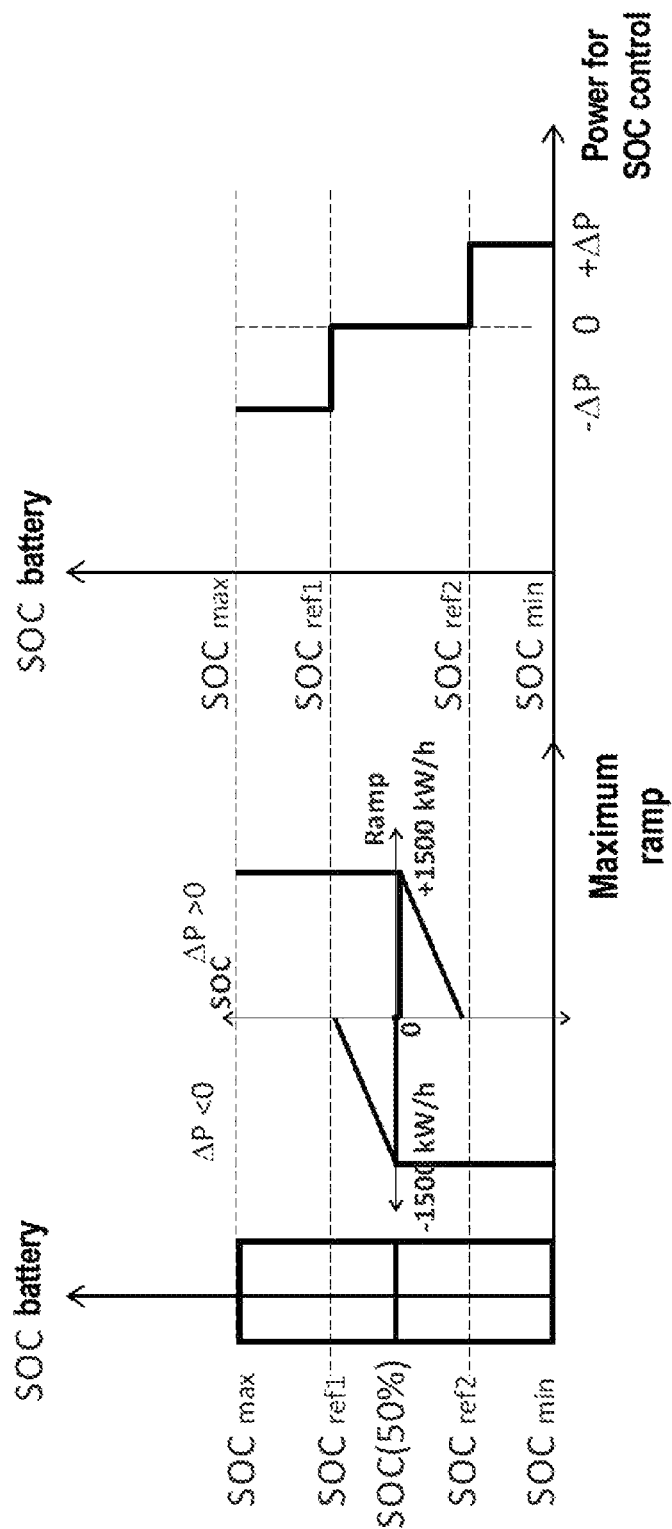
FIG. 9.—It shows the SOC requirements of the battery according to the maximum ramp to the left, and to the power for the control of SOC to the right, for a combination of the substage of setting the dynamic component defined as the slope with which the power in the plant is to be varied in each control cycle, according to the state of charge of the energy storage system (SOC), and the substage of setting a control algorithm of the state of charge of the energy storage system.

FIG. 9 shows the SOC requirements of the battery according to the maximum ramp to the left, and to the power for the control of SOC to the right, for a combination of the substage of setting the dynamic component of the ramp defined as the slope with which the power in the plant is to be varied in each control cycle, according to the state of charge (SOC) of the energy storage system, and the substage of setting a control algorithm of the state of charge of the energy storage system.

In this preferred embodiment example, the values of the SOC which are optimal for the plant are determined, shown in FIG. 9, referred to as SOCref1, between SOC (50%) and SOCmax and SOCref2, between SOC (50%) and SOCmin defining the optimum of the dynamic ramp when under the mentioned conditions of the power generated by the plant, great fluctuations can occur in the plant output which can reach a 90% value.

These values SOCref1 and SOCref2 depend on the maximum ramp demanded as a requirement. If the maximum ramp required is very high, the battery necessary to achieve it will be very small and the SOC variations of the battery caused by the plant will be fast, and the other way round. This changes the optimal value between these values spacing.

Preferably, SOCref1 and SOCref2 are values close to each other but different to avoid an unstable operation of the method, since using very different values weakens the dynamic ramp benefit.

The substage of setting the dynamic component of the ramp defined as the slope with which the power in the plant is to be varied in each control cycle, according to the state of charge (SOC) of the energy storage system, for all the examples previously described may be a constant or variable value, according to the difference between the SOC of the energy storage system and its target SOC.

Figure 10:
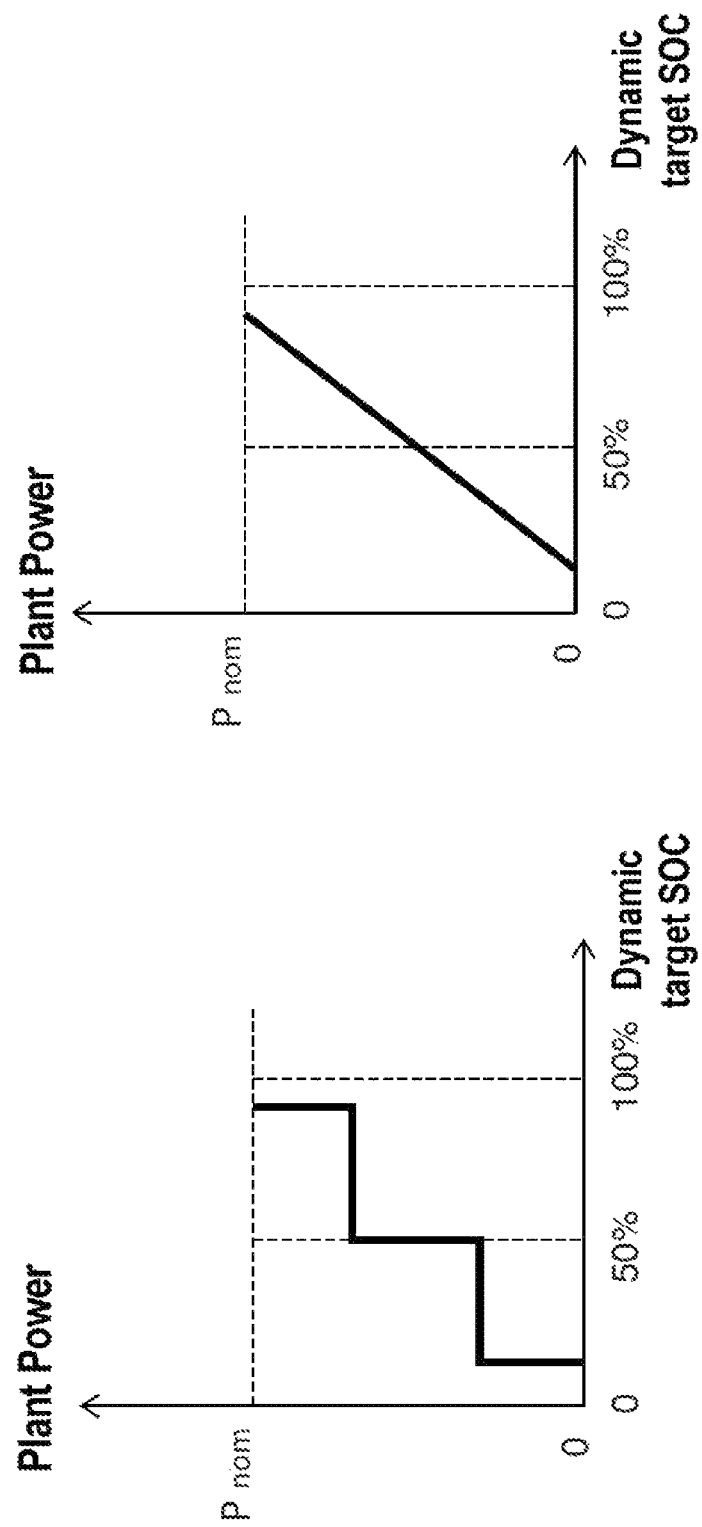
FIG. 10.—It shows several examples of the SOC of the plant power when the dynamic target SOC has been applied according to the instant power generated by the plant and/or foreseeing thereof by means of weather forecasting.

FIG. 10 shows the requirements of the target SOC applied to the substage of setting the target state of charge ($SOC_{tar}$) of the energy storage system dynamically, according to the instant power generated by the plant, and/or foreseeing thereof by means of weather forecasting.

Additionally, the method may have a measuring time of the power fluctuations significantly longer than the control cycle time thereof, causing a control by steps. Since the control system of the plant will have a cycle time based on the calculation speed and on communications speed which may usually be between 100 ms and 5 sec, and since, however, the electrical grids will show inertia due to the synchronous generators connected thereto, and the primary control devices which can be of minutes, the requirement of achieving the ramps can be fulfilled according to measuring performed every certain number of minutes, for example 15 min.

In these cases, a time period is defined to measure the power fluctuation. In order to do that, a strategy called step is realized, known in the state of the art, defining values by steps during the fluctuation measuring time where any fluctuation not exceeding that step does not require any action, whereas fluctuation values exceeding that step change the level of the target step.

Figure 11:
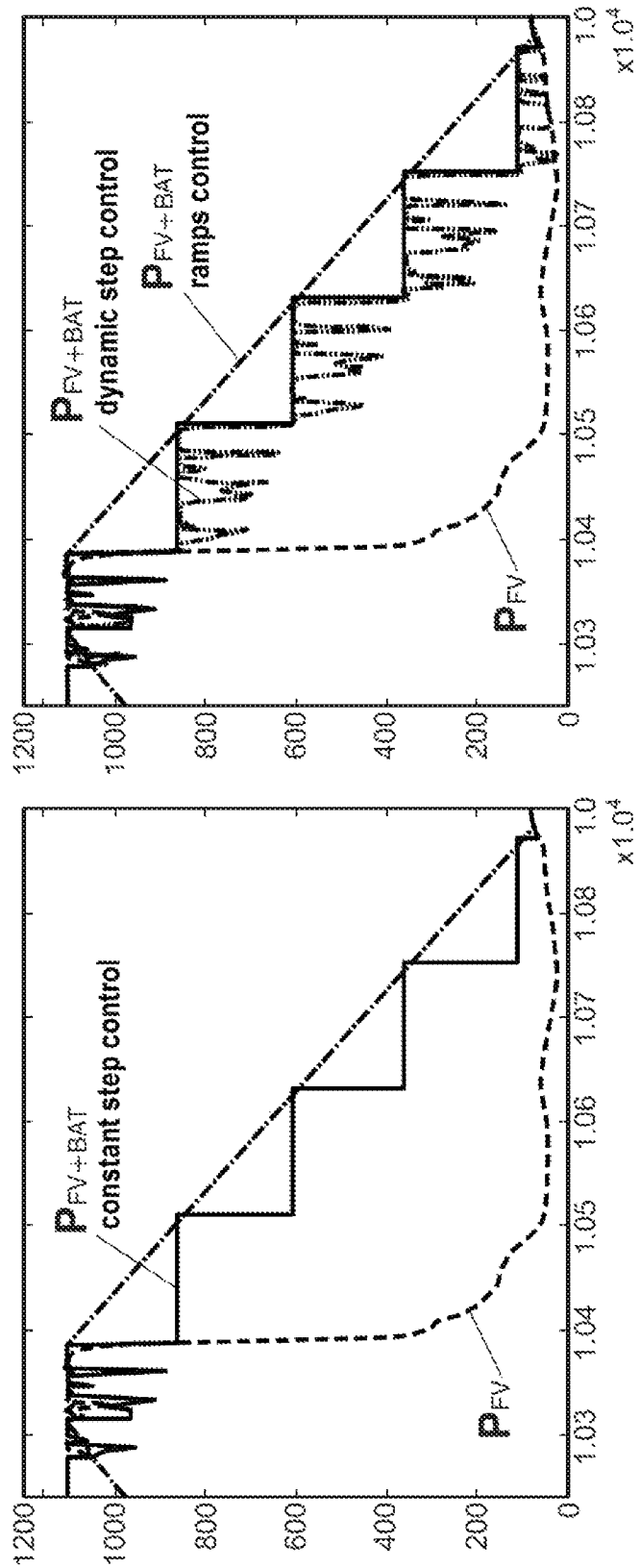
FIG. 11.—It shows charts representing the plant power to which a constant step method has been applied, to the left, and a method of a simple step to the right, both known in the state of the art.

FIG. 11 shows the situation of the constant step, and the simple step for the static situation from the state of the art.

As it is shown in said FIG. 11, power steps can be built up achieving the determined time with the power fluctuation, so that the power is constant during the time between two measurements (15 min for example), which is referred to as constant step, whereby a smaller capacity of the battery is required, equivalent to the area in the power curve between the output of the plant and the generation of the plant. Steps may also be built up reproducing power fluctuations within the time of the step to reduce even more the required size for the battery, which has been referred to as simple step, which belongs to the state of the art.

Figure 12:
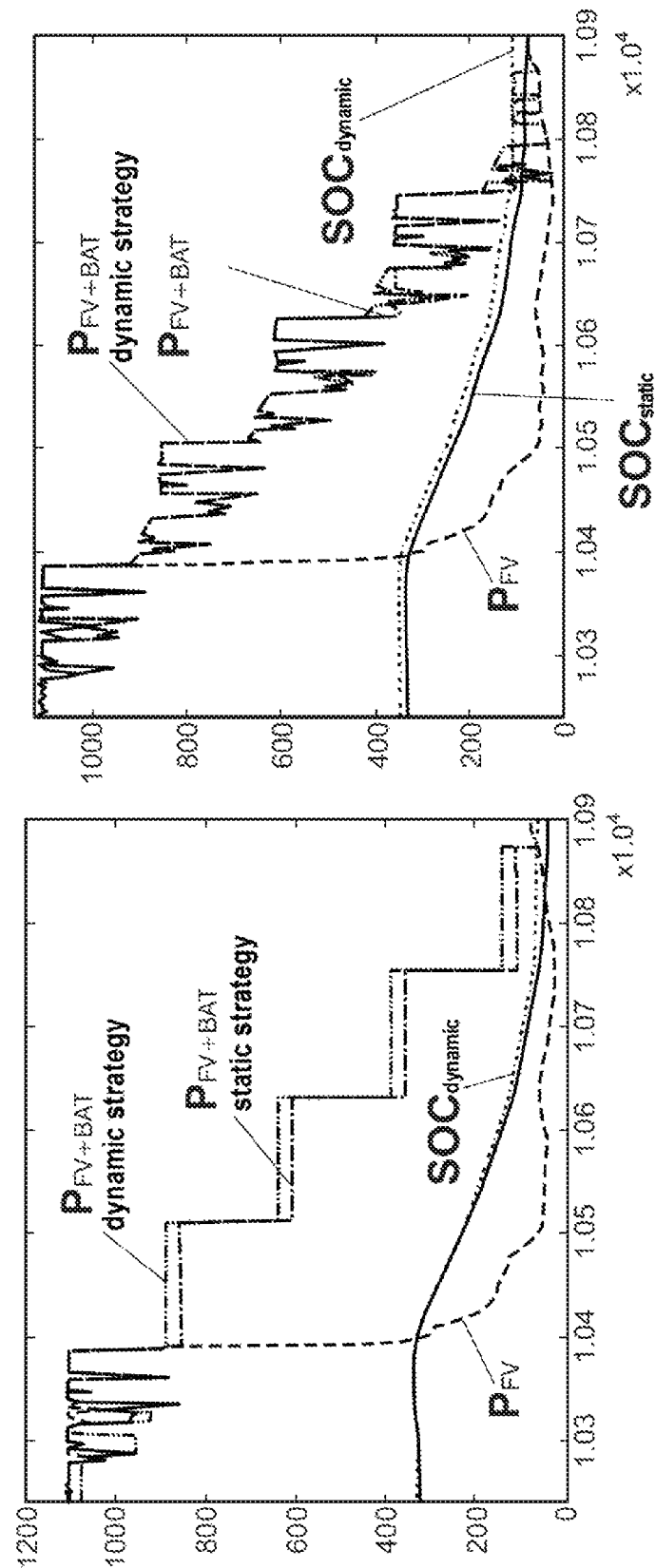
FIG. 12.—It shows charts representing the plant power to which a constant step method has been applied, to the left, and a method of a simple step to the right, according to the dynamic ramp method of the present invention.

The strategies called steps may also be applied to the strategies described above of dynamic ramps according to the SOC (combined or not with the control SOC function), or dynamic SOC according to the instant generation of the plant. FIG. 12 shows the effect of applying the dynamic ramps to the two possible types of steps.

Additionally, in this embodiment example, the method for the control of the power fluctuation ramps with a battery in intermittent power generation plants comprises a substage of determining the state of charge according to the systems of weather forecasting in short periods of time. These systems seek to predict, usually for a pre-established period of time of the solar plants operation subsequent to the current one, which is preferably of 1 hour, the available radiation and thus the solar plant generation, with an accuracy of less than 1 minute. Examples of these systems are based on sky cameras, current wind and radiation values, and the use of cloudiness images of the satellite in real time, and they can be used to define the existing conditions in the plants during this period.

Figure 13:
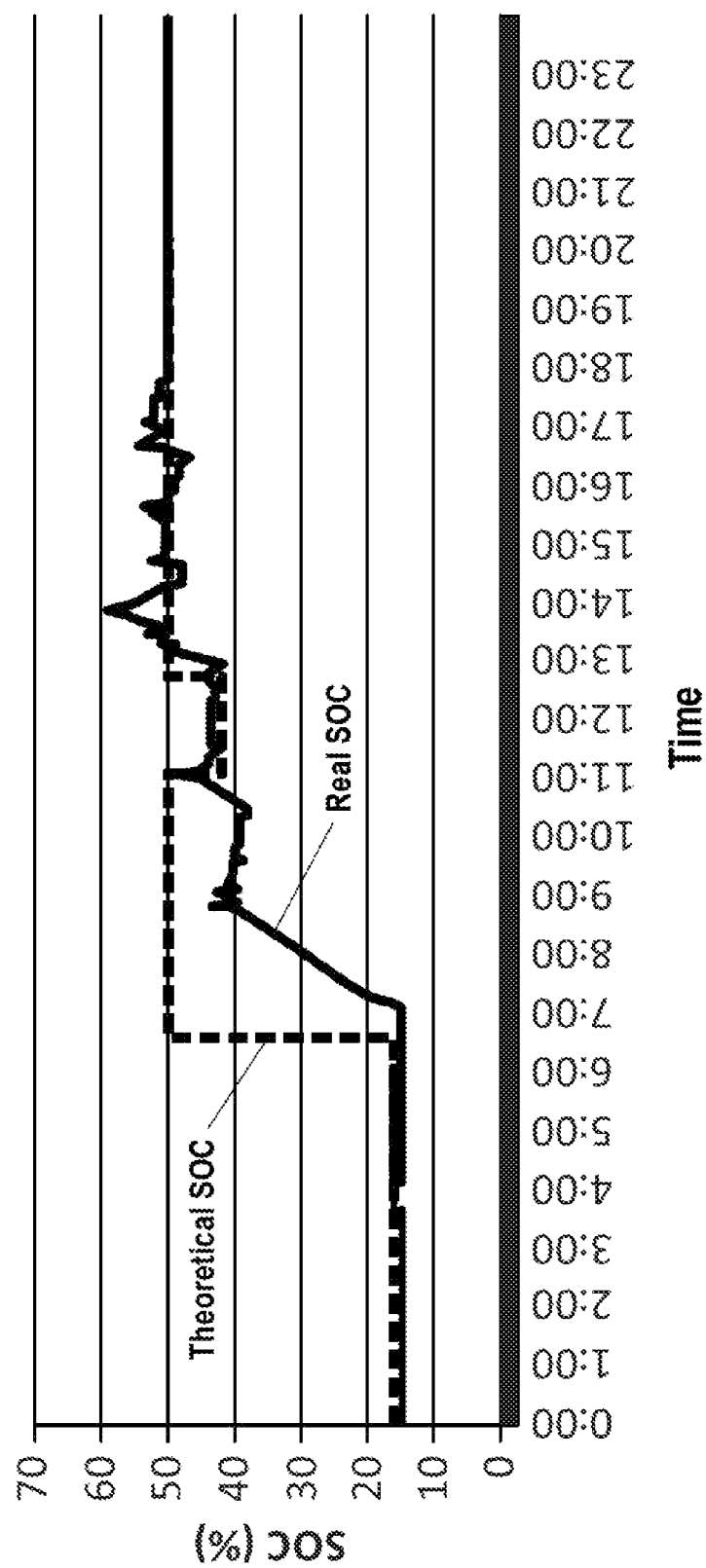
FIG. 13.—It shows a chart of the evolution of the state of charge, which in this example is a battery, both theoretical and real along a day in which the method of dynamic ramp of the present invention is applied, where the theoretical charge value reflects the target SOC which varies according to the generation and/or generation prediction conditions, and how the algorithm is tracking this real charge value.

With a prediction of this type, the future radiation conditions can be turned into foreseen variations of the state of charge of the battery to achieve the target power fluctuations, and to adapt the dynamic ramps with which the plant will operate beforehand to minimize the deviation of the state of charge of the target reference battery, as it is shown in FIG. 13.

An example of implementation of the method of the present invention would be as follows:
Dynamic ramp varying between 40% and 60% of the SOC.
Control of the SOC if battery SOC<40%→continuous charge algorithm.
Control of the SOC if battery SOC>60%→continuous discharge algorithm.

The invention claimed is:
1. A Method of controlling power fluctuation ramps with energy storage systems in intermittent power generation plants, the method comprising:
  a. Feeding power into the grid from intermittent power generation plants with a power system controller, wherein the controller sets a power variation maximum ramp and wherein setting the power variation maximum ramp comprises:
    i. Setting a dynamic component of the ramp with the power system controller, wherein the dynamic component of the ramp is the slope with which the power in the plant is to be varied in each control cycle, according to the state of charge of the energy storage system; and
    ii. Dimensioning a total power capacity of the energy storage system with the power system controller, wherein the total power capacity is dimensioned based on the dynamic component of the ramp wherein setting the dynamic component of the ramp defined as the slope with which the power in the plant is to be varied in each control cycle, according to the state of charge (SOC) of the energy storage system, comprises a stage of filtering dynamic ramps for them not to operate if the plant power is too low or it it is too close to nominal power.

2. The method of claim 1, further comprising a substage of setting a control algorithm of the state of charge of the energy storage system which adds to the calculation a component of charging or discharging the system, so that there is no deviation from the target SOC, and always observing a limiting maximum ramp.

3. The method of claim 1, wherein setting the dynamic component of the ramp defined as the slope with which the power in the plant is to be varied in each control cycle, according to the state of charge (SOC) of the energy storage system is carried out, if the state of charge is below a reference value, the slopes are modified so as to help the storage system to be charged, whereas if the state of charge of the storage system is higher than the reference value, the slopes are modified so as to help discharging the storage system.

4. The method of claim 3, wherein setting the dynamic component of the ramp defined as the slope with which the power in the plant is to be varied in each control cycle, according to the state of charge (SOC) of the energy storage system, is a constant or variable value according to the difference between the SOC of the energy storage system and its target SOC.

5. The method of claim 1, wherein the stage of filtering the dynamic ramps out of range, is comprised between 30 and 70% of the plant nominal power.

6. The method of claim 2, wherein the substage of setting a control algorithm of the state of charge of the energy storage system comprises adding:
 a component of charging the system if the state of charge of the energy storage system is below the target SOC, and
 a component of discharging the system if the state of charge of the energy storage system is above the target SOC.

7. The method of claim 6, wherein the substage of setting a control algorithm of the state of charge of the energy storage system uses a deadband or hysteresis to limit the activation conditions of this algorithm to deviations from the target SOC which are great enough.

8. The method of claim 6, wherein the substage of setting a control algorithm of state of charge of the energy storage system increases the target SOC from 50% to a value between 70 and 100% if the plant generates more than 70% of its nominal power, whereas the target SOC is reduced from the 50% to a value between 0 and 30% if the plant produces less than 30% of its nominal power.

9. The method of claim 1, wherein the method is applied to a step strategy.

10. The method of claim 1, wherein the energy storage system is selected from the group consisting of: a battery, supercapacitors and flywheels.

11. The method of claim 1, wherein the intermittent power generation plant is selected from the group consisting of: photovoltaic solar plants, wind farms and tidal power plants.

12. The method of claim 1, wherein the controller setting the power variation maximum ramp further comprises:
 a substage of dynamically setting the target state of charge ($SOC_{tar}$) of the power storage system, according to the instant power generated by the plant, and/or foreseeing thereof by weather forecasting.

13. The method of claim 12, wherein the substage of setting the dynamic component of the ramp defined as the slope with which the power in the plant is to be varied in each control cycle, according to the state of charge (SOC) of the energy storage system, comprises a stage of filtering dynamic ramps for them not to operate if the plant power is too low or if it is too close to nominal power.

14. The method of claim 12, further comprising a substage of setting a control algorithm of the state of charge of the energy storage system which adds to the calculation a component of charging or discharging the system, so that there is no deviation from the target SOC, and always observing a limiting maximum ramp.

15. The method of claim 1, further comprising a substage of setting a control algorithm of the state of charge of the energy storage system which adds to the calculation a component of charging or discharging the system, so that there is no deviation from the target SOC, and always observing a limiting maximum ramp.

16. The method of claim 12, wherein setting the dynamic component of the ramp defined as the slope with which the power in the plant is to be varied in each control cycle, according to the state of charge (SOC) of the energy storage system is carried out, if the state of charge is below a reference value, the slopes are modified so as to help the storage system to be charged, whereas if the state of charge of the storage system is higher than the reference value, the slopes are modified so as to help discharging the storage system.

17. The method of claim 1, wherein setting the dynamic component of the ramp defined as the slope with which the power in the plant is to be varied in each control cycle, according to the state of charge (SOC) of the energy storage system is carried out, if the state of charge is below a reference value, the slopes are modified so as to help the storage system to be charged, whereas if the state of charge of the storage system is higher than the reference value, the slopes are modified so as to help discharging the storage system.

18. The method of claim 2, wherein setting the dynamic component of the ramp defined as the slope with which the power in the plant is to be varied in each control cycle, according to the state of charge (SOC) of the energy storage system is carried out, if the state of charge is below a reference value, the slopes are modified so as to help the storage system to be charged, whereas if the state of charge of the storage system is higher than the reference value, the slopes are modified so as to help discharging the storage system.

19. The method of claim 16, wherein setting the dynamic component of the ramp defined as the slope with which the power in the plant is to be varied in each control cycle, according to the state of charge (SOC) of the energy storage system, is a constant or variable value according to the difference between the SOC of the energy storage system and its target SOC.

* * * * *

UNITED STATES PATENT AND TRADEMARK OFFICE
CERTIFICATE OF CORRECTION

PATENT NO. : 10,291,031 B2
APPLICATION NO. : 15/025925
DATED : May 14, 2019
INVENTOR(S) : Padros et al.

Page 1 of 1

It is certified that error appears in the above-identified patent and that said Letters Patent is hereby corrected as shown below:

In the Claims

Column 10, Claim 1, Line 54, please delete the second occurrence of the word "it".

Signed and Sealed this
Seventeenth Day of September, 2019

Andrei Iancu
*Director of the United States Patent and Trademark Office*